July 31, 1956  R. E. GREENOUGH  2,756,950
AIRCRAFT LAUNCHING DEVICE, INCLUDING A ROCKET
PROPELLED BALL SCREW AND NUT
Filed Oct. 7, 1954  2 Sheets-Sheet 1

INVENTOR.
RAYMOND E. GREENOUGH
BY
ATTORNEY

July 31, 1956  R. E. GREENOUGH  2,756,950
AIRCRAFT LAUNCHING DEVICE, INCLUDING A ROCKET
PROPELLED BALL SCREW AND NUT
Filed Oct. 7, 1954  2 Sheets-Sheet 2
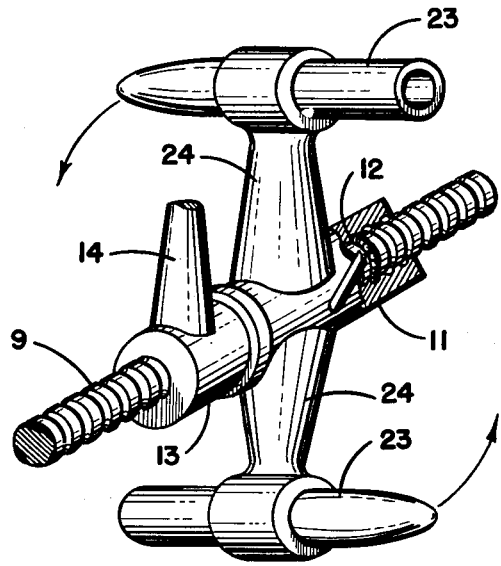
FIG. 4
FIG. 5
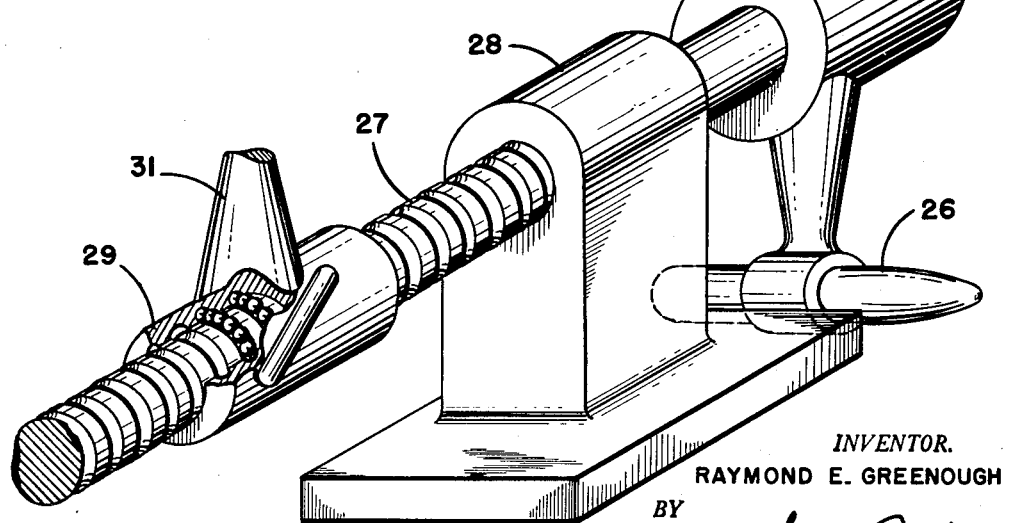
INVENTOR.
RAYMOND E. GREENOUGH
BY
*John E. Renfro*
ATTORNEY

United States Patent Office 2,756,950
Patented July 31, 1956

2,756,950

AIRCRAFT LAUNCHING DEVICE, INCLUDING A ROCKET PROPELLED BALL SCREW AND NUT

Raymond E. Greenough, Berea, Ohio, assignor to The Cleveland Pneumatic Tool Company, Cleveland, Ohio, a corporation of Ohio Application October 7, 1954, Serial No. 460,891

2 Claims. (Cl. 244—63)

This invention relates to launching devices in general and more particularly to a ball screw launching device for aircraft and the like in which the rotary thrust for driving the ball screw is supplied by jet type motors.

In a launching device according to this invention a motor means is used which operates through a relatively great distance so that smaller forces can be utilized to supply the required energy. This reduces the bulk of the motor means while still providing the necessary amount of work. To accomplish this end, motion converting means convert work done through a great distance to work useable through the shorter distance which is needed. This motion converting mechanism is preferably a ball screw device since such devices provide highly efficient conversion.

A device according to this invention also includes motor means which are capable of operating efficiently through wide speed ranges since the motor means starts from rest and reaches a high velocity during the cycle of operation. Therefore, a device according to this invention contemplates the use of motor means of the type characterized, as jets. For purposes of this disclosure it should be understood that the term jet should include both self contained rockets and motors wherein air is drawn into the motor means and used to burn fuel to provide the exhaust jet.

It is an important object of this invention to provide an aircraft launching device which includes an anti-friction ball bearing screw powered by jet motor means.

It is another important object of this invention to provide an aircraft launching device that utilizes motor means which operate through a device which produces a mechanical advantage so that relatively small forces developed by the motor means effects much larger launching forces.

Figure 4 is an enlarged fragmentary perspective view of the ball screw and jet motor used to power the launcher; and, Figure 5 is an enlarged fragmentary perspective showing another embodiment of the jet driven ball screw according to this invention.

Figure 1:
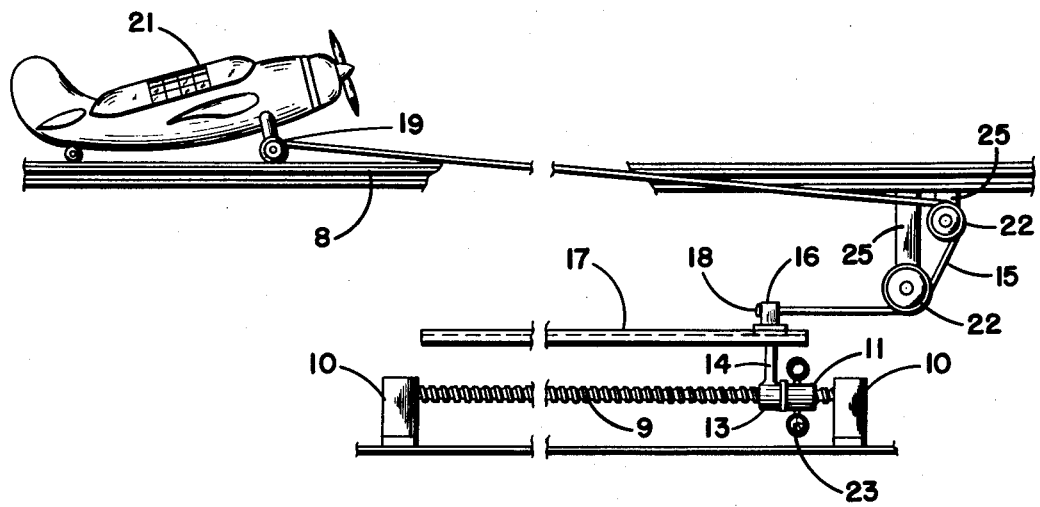
Figure 1 is a schematic view showing an aircraft launching device incorporating this invention shown with the various elements in the positions they assume prior to launching.
Figure 2:
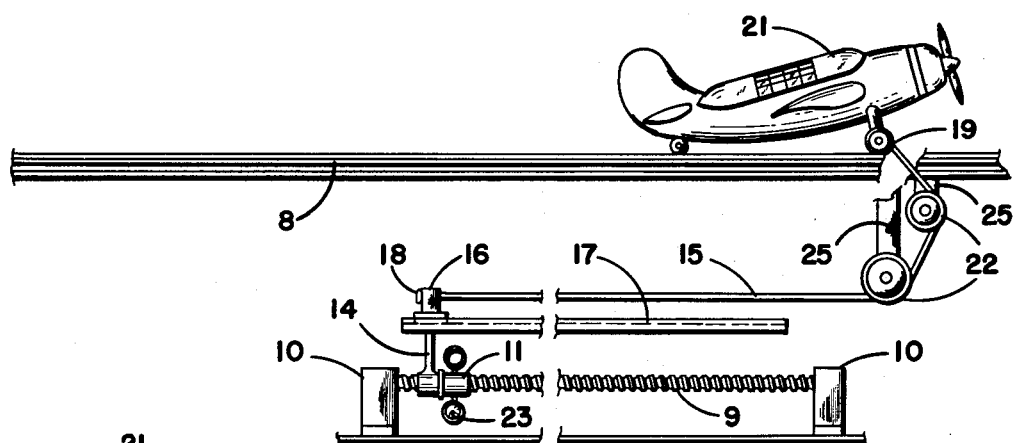
Figure 2 is a schematic view of the aircraft launching device shown in Figure 1 showing the relationship of the various elements at the end of the launching operation.
Figure 3:
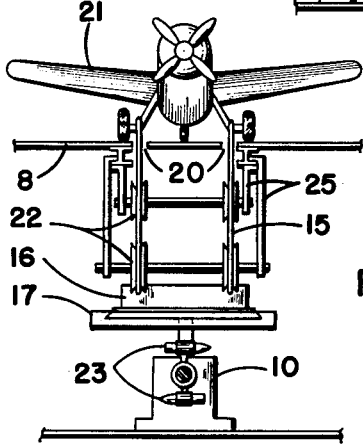
Figure 3 is an end view of the launching device shown in Figures 1 and 2.

For a clear understanding of this invention reference should be made to the drawings wherein a schematic showing of an installation on an aircraft carrier is illustrated. In this illustration the launcher operating mechanism is positioned below a flight deck 8 and includes a driving or motor mechanism and a connecting cable system operably connecting the motor mechanism and the aircraft. The driving mechanism comprises a screw 9 mounted on supports 10. The nut 11 is fitted around the screw 9 in the usual manner and both the nut and screw are provided with helical grooves which define a helical channel within the nut filled with balls 12 which connect the screw and nut in such a way that rotational motion of the nut relative to the screw creates axial motion of the nut on the screw. Mounted on one end of the nut 11 is a thrust member 13 rotatably connected to the nut in such a manner that axial thrust may be transmitted therebetween without rotational motion of the thrust member. The thrust member 13 is provided with a laterally extended arm 14 which is connected to an axially movable cross head 16. A guide rail 17 of a length substantially equal to that of the screw and parallel thereto engages the cross head 16 providing means for limiting rotational motion of the thrust member 13 and arm 14 while permitting free axial movement thereof.

A cable 15 extends through the slots 20 in the flight deck 8 and is connected at one end 18 to the cross head 16 and at the other end 19 to the aircraft 21. The cable also extends around pulleys 22 fixed to the flight deck 8 by the supports 25 thereby translating the line of thrust from the cross head 16 to the aircraft.

Mounted on the nut 11 are two or more arms 24 on which are mounted jet motors 23 arranged to provide thrust tangentially with respect to the nut movement. In the preferred embodiment these jet motors should be self contained rockets provided with a propelling charge sufficient for one launching operation. After each launching operation the jet motors are therefor either replaced or recharged. Since jets produce thrust by reaction forces developed by the flow of gases through the jet, satisfactory thrust can be developed over extremely wide speed ranges. This feature is extremely desirable in this invention since the motors start at rest and reach an extremely high velocity during each launching due to the motion converting feature of the ball screw. To eliminate lateral forces on the nut 11 two or more jet motors 23 are used which are symmetrically located relative to the nut.

Since the thrust of the jet motors 23 operate through both the mechanical advantage of the ball screw and the lever length of the arms 24, essentially any desired launching thrust may be achieved with any given jet motor merely by choosing the proper lever arm length in combination with the mechanical advantage of the ball screw. Also since such jet motors are small and light when compared to low velocity pressure pistons, substantial weight savings may be realized which are extremely important particularly on shipboard installations. A suitable igniting means is utilized to ignite the jet motors when the launcher is to be fired and the connecting means at 19 between the cable system and aircraft are arranged so that the aircraft is automatically released at the end of the stroke.

Another embodiment of this invention is shown in Figure 5 where jet motors 26 are mounted on the end of a screw 27 which is in turn mounted for rotation around its axis in bearings 28. In this embodiment a nut 29 is held against rotation by an arm 31 and the screw is rotated to provide the relative rotational motion between the nut and the screw.

It should be understood that in both embodiments braking means should be provided to bring the ball screw mechanism to rest after the aircraft is launched and it is contemplated that cable buffers, brakes or dampers could be utilized for this purpose.

Although a preferred embodiment of this invention is illustrated, it will be realized that various modifications of the structural details may be made without departing from the mode of operation and the essence of the invention. Therefore, except insofar as they are claimed in the appended claims, structural details may be varied widely

I claim:

1. An aircraft launching device comprising cooperating first and second screw threaded elements, antifriction members interconnecting said elements whereby rotational motion between said elements provides relative axial motion therebetween, the lead of the threads on said elements being constant throughout their length, jet motor means tangentially mounted on one of said elements providing relative rotation therebetween, and connecting means connected to said one element at one end and to an aircraft at the other end whereby forces produced by axial motion of said one element relative to the other element assists the aircraft in take-offs.

2. An aircraft launching device comprising cooperating first and second screw threaded elements, antifriction ball bearings interconnecting said elements whereby rotational motion between said elements provides relative axial motion therebetween, the lead of the threads on said elements being constant throughout their length, a thrust member axially fixed and rotatably movable relative to one of said elements, jet motor means tangentially mounted on said one element for rotating said one element relative to the other of said elements, and connecting means connected to said thrust member at one end and to an aircraft at the other end whereby axial motion of said one element and thrust member relative to said other element assists the aircraft in take-offs.

References Cited in the file of this patent

UNITED STATES PATENTS

| | | |
|---|---|---|
| 2,178,014 | Brown | Oct. 31, 1939 |
| 2,270,735 | Knudsen | Jan. 20, 1942 |
| 2,437,700 | MacFarland | Mar. 16, 1948 |
| 2,452,633 | Cautley | Nov. 2, 1948 |
| 2,578,560 | Kuss | Dec. 11, 1951 |
| 2,636,397 | Jacubenta | Apr. 28, 1953 |

FOREIGN PATENTS

| | | |
|---|---|---|
| 9,403 | Great Britain | of 1912 |